May 23, 1961 L. F. MATTI 2,985,301
DIFFERENTIAL GEAR DRIVE FOR CHECK WEIGHER
Filed July 2, 1959 2 Sheets-Sheet 1
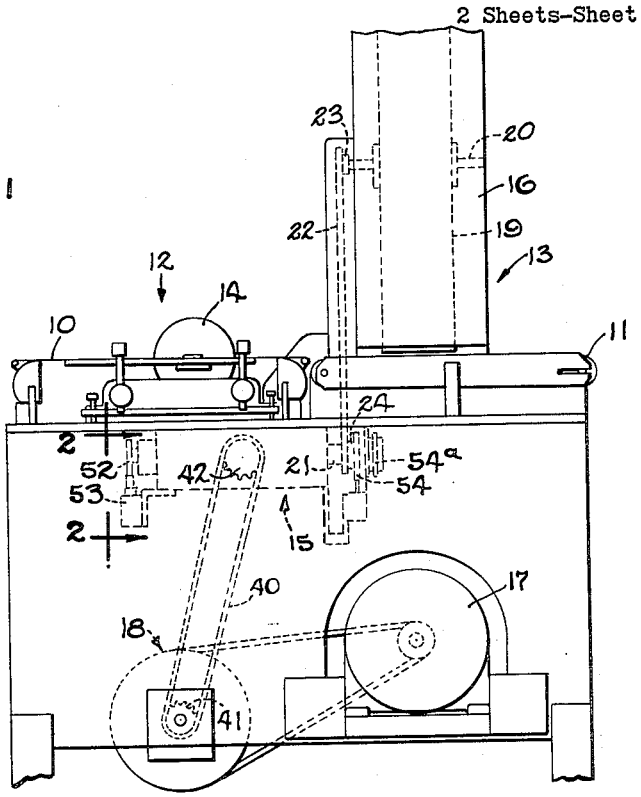
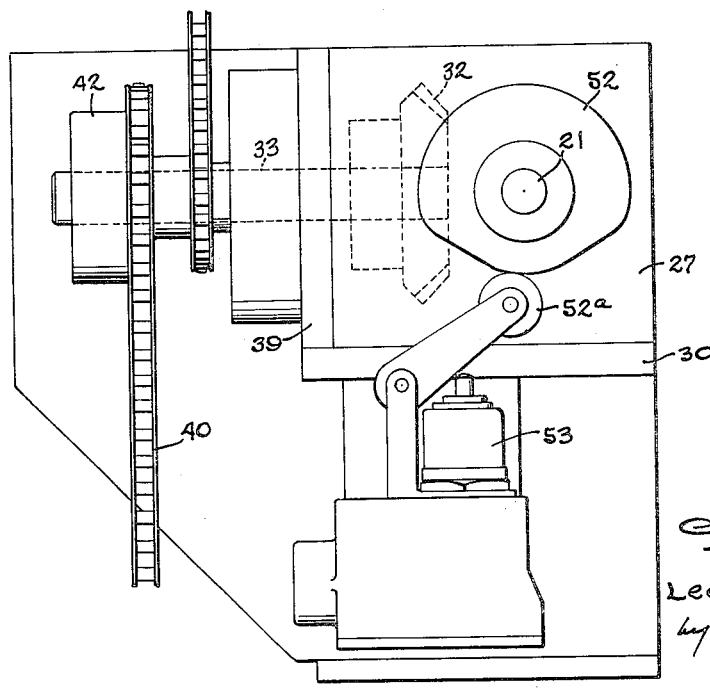
INVENTOR
Leo F. Matti
by Wolfe, Hubbard,
Voit & Osann
ATTORNEY

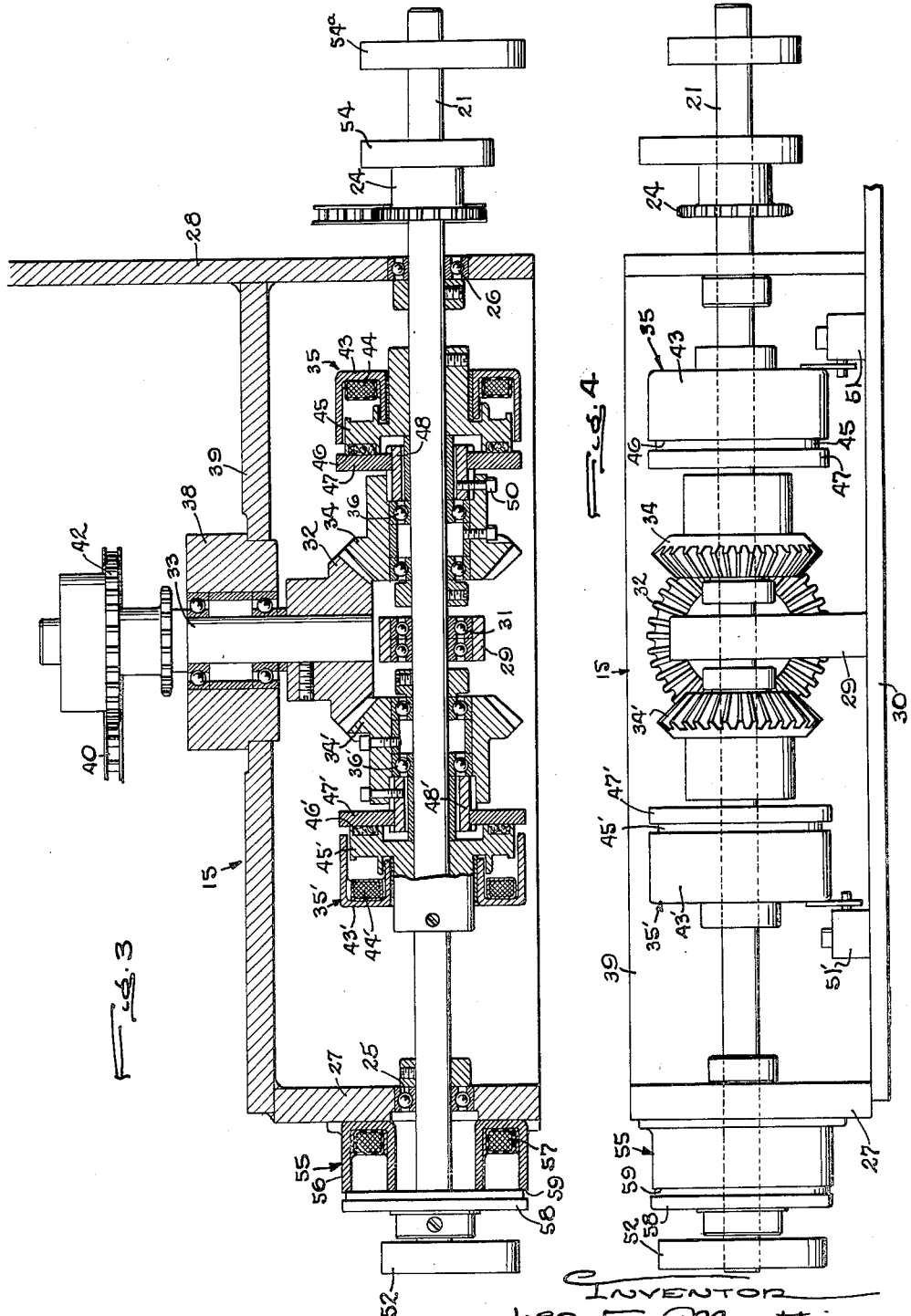

United States Patent Office 2,985,301
Patented May 23, 1961

2,985,301
DIFFERENTIAL GEAR DRIVE FOR CHECK WEIGHER

Leo F. Matti, Rockford, Ill., assignor to Bartelt Engineering Company, Rockford, Ill., a corporation of Illinois Filed July 2, 1959, Ser. No. 824,660
5 Claims. (Cl. 209—121)

This invention relates to a device for classifying articles according to some characteristic of the article such as weight and more particularly to a device in which a succession of articles are advanced past a classifying station by a belt conveyor and are separated into groups according to their characteristics by a classifying member which moves transversely of the conveyor in either direction in response to signals from a device which senses the characteristic of the article.

The general object of the invention is to provide, in a device of the above character, a simple, compact drive mechanism having an output shaft which may be rotated selectively in either direction to move the classifying member in either direction.

Another object is to achieve the foregoing object by selectively coupling to the shaft either of two gears continuously driven in opposite directions.

A more detailed object is to couple the gears to the shaft by clutches selectively engaged by a signal from the sensing device.

Other objects and advantages of the invention will become apparent from the following detailed description taken in connection with the accompanying drawings, in which Figure 1 is a side elevational view of a check weigher embodying the novel features of the present invention.

Fig. 2 is an end view of the actuating mechanism taken along line 2—2 in Fig. 1.

Fig. 3 is a top view of the actuating mechanism with parts broken away as shown in section.

Fig. 4 is a side elevation of the actuating mechanism.

The present invention is shown in the drawings for purposes of illustration embodied in a check weigher such as the one disclosed in copending application Serial No. 723,478, filed March 24, 1958, to which reference may be had for the details of construction. Devices of this type are usually used in conjunction with packaging machines to check the weight of the packages filled by the latter and to classify the packages according to whether they are within, over or under a predetermined acceptable range of weight.

The filled packages are carried along the check weigher by two conveyors 10 and 11 of the endless belt type, one moving the packages through a weighing station 12 and the other moving them through a classifying station 13. The packages are moved past a weighing mechanism 14 which produces a signal corresponding to the weight of the package and is operable through a suitable actuating mechanism 15 to shift a classifying mechanism 16 which separates the overweight, underweight, and acceptable packages into three groups as the packages are carried through the classifying section 13 by the second belt conveyor 11. Power to drive the conveyor belts 10 and 11 and the classifying mechanism 16 is provided by a motor 17 mounted on the frame of the check weigher and coupled to these elements through suitable speed reducing means 18.

The classifying mechanism 16, in the present instance, comprises a classifying member 19 disposed adjacent the conveyor belt 11 and operable to shift back and forth transversely of the belt to move the packages onto different parts of the belt according to the relationship of their weight to the predetermined acceptable range of weight. The classifying member 19 is shifted by the rotation of a shaft 20 operatively connected to the member and journaled in the classifying station 13 to rotate about an axis parallel to the belt conveyor. Rotation is imparted to the shaft 20, in response to the signal produced by the weighing mechanism 14, by the actuator 15 through the medium of a chain 22 extending between sprockets 23 and 24 fixed to the shaft 20 and to an output shaft 21 of the actuator respectively.

The output shaft 21 of the actuator 15 is journaled intermediate its ends in frictionless bearings 25 and 26 (Fig. 3) mounted in end plates 27 and 28 disposed at either end of the actuator and fixed to the frame of the check weigher beneath the weighing station 12. To aid in supporting the shaft 21 a post 29 projects upwardly from a bottom plate 30 welded to the lower edge of the end plates 27 and 28. The shaft is journaled in a frictionless type bearing 31 mounted in the post.

In order to shift the classifying member 19 in either direction across the belt conveyor 11 and thus enable classifying of the packages into the three different groups, the shaft 20 and the actuator shaft 21 are selectively rotated in either direction in response to a signal from the weighing mechanism. Further, in order to position the packages at fixed points relative to the belt 11 and across the belt so that the different groups are moved along definite paths by the belt, the classifying member 19 is moved through a predetermined distance by rotating the shaft 20 and the actuator shaft 21 through a predetermined angle.

The present invention contemplates a simple, compact mechanism for rotating the shaft 21 in either direction in response to a signal from the weighing mechanism. This mechanism comprises a driving gear 32 mounted on a continuously driven input shaft 33 and driving two similar driven gears 34 and $34^1$ mounted to mesh with opposite sides of the driving gear 32 and thus to be rotated by the latter in opposite directions. The driven gears 34 and $34^1$ are selectively coupled to the output shaft 21 of the actuating mechanism 15 by clutch means 35 and $35^1$ which engage in response to the signal from the weighing mechanism 14. The actuating mechanism is thus operable to transform the continuous rotation imparted from the motor 17 to the input shaft 33 into intermittent rotation in either direction of the output shaft 21 and thereby to shift the classifying member 19 in either direction across the belt in response to the signal of the weighing mechanism 14.

In the present instance, a driving bevel gear 32 is fixed to the input shaft 33 which is journaled to rotate about an axis perpendicular to the axis of the output shaft 21. The gears 34 and $34^1$ are bevel gears mounted concentric with the output shaft 21 and disposed so as to mesh with the driving gear on opposite sides thereof. The bevel gears 34 and $34^1$ are journaled on the output shaft 21 by means of frictionless bearings 36 and $36^1$ to rotate relative to the shaft and are selectively coupled to the shaft by engaging one or the other of the clutches 35 and $35^1$.

Herein, the input shaft 33 is journaled in a bearing 37 mounted in a block 38 fixed to a side plate 39 which in turn is welded to the side edges of the end plates 27 and 28. Continuous rotation is imparted to the shaft 33 by the motor 17 which is coupled to the shaft through the medium of the speed reducer 18 by a chain 40 extending between sprockets 41 and 42 mounted on the speed reducer and the input shaft respectively. The driven bevel gears 34 and $34^1$ are spaced apart along the output shaft 21 so as to engage the driving gear 32 on opposite sides thereof and are thus continuously rotated relatively to the output shaft in opposite directions. The direction of rotation of the output shaft 21 is determined by which of the driven gears 34 or 34¹ is coupled to the output shaft by engagement of the clutches 35 or 35¹ in response to the signal of the weighing mechanism 14.

While various types of clutches may be utilized to couple the driven gear to the shaft, preferably an electromagnetic clutch 35 is employed having an annular core 43 of generally U-shaped cross section and enclosing an energizing coil 44. The core 43 is telescoped with a pole ring 45 fixed to the output shaft 21 of the actuating mechanism and having pole faces 46 which coact with an armature ring 47 splined on a sleeve 48 to move into gripping engagement with the pole faces 46 upon energization of the coil. The sleeve 48 is secured by means of a set screw 50 to the hub portion of the bevel gear 34 to rotate therewith. The annular core 43 is disposed concentric to the shaft 21 and is mounted in a fixed position relative to the shaft and prevented from rotating by a bracket 51 attached to the bottom plate 30. The coupling between the gear 34¹ and the shaft 21 is similar and corresponding parts are identified by the same but primed reference characters.

If the weight of the packages passing over the weighing mechanism 14 is not within the acceptable range, a signal is produced and transmitted through a suitable circuit to one or the other of the clutches depending upon whether the weight is above or below the standard. This signal engages the clutch thereby coupling the output shaft 21 to the input shaft 33 thereby rotating the output shaft in a direction corresponding to the desired direction of movement of the classifying member 19.

The signal produced by the weighing mechanism 14 is of a somewhat short duration to permit advancing the packages along the check weigher in rapid succession. This signal energizes the coil 44 and engages the clutch 35 to start the output shaft 21 rotating. In order to maintain the clutch 35 in an engaged condition throughout the desired angle of rotation of the output shaft 21, a cam 52 is fixed to one end of the shaft to coact with a follower 52ª (Fig. 2) to close a switch 53 after a slight rotation of the shaft 21 effected by the signal. The switch 53 completes a circuit energizing the coil of the clutch and maintains this circuit until the shaft 21 has rotated through the desired angle.

In order to limit the angle of rotation of the shaft 21 and thereby limit the movements of the classifying member 19 between fixed points relative to the belt 11, a cam 54 is fixed to the output shaft to coact with a follower (not shown) which, in turn, coacts with a switch (not shown) to break the circuit energizing the coil after rotation of the shaft through the predetermined angle. In the form of the invention illustrated in the drawings, two cams 54 and 54ª are utilized, one to control the rotation of the shaft 21 in each direction and each permits a single revolution of the shaft.

To hold the shaft 21 in a fixed position when the clutches 35 and 35¹ are disengaged, and to stop the rotation of the shaft immediately after the clutch is disengaged, a brake 55 grips the shaft at all times when the clutches 35 and 35¹ are disengaged. While various types of brakes may be used in the illustrated form of the invention an electromagnetic brake is employed having an annular core 56 of generally U-shaped cross section mounted on the end plate 27 concentrically with the shaft 21 and enclosing an energizing coil 57. An armature 58 is fixed to the output shaft 21 and is adapted to move into gripping engagement with pole faces 59 formed on the core 56 upon energization of the coil. The circuit controlling the actuating mechanism 15 is such as to de-energize the brake coil whenever one of the clutches is engaged and to energize the brake coil whenever the clutches are disengaged.

It will be apparent that the simple, compact mechanism described above imparts the desired controlled movements to a classifying mechanism in response to signals produced by a weighing mechanism with a minimum of mechanical parts. The continuous rotation of the input shaft is converted into intermittent rotation in either direction of the output shaft. At the completion of each movement of the classifying mechanism, the actuator is automatically reset and in condition to move in response to the next signal from the weighing mechanism.

I claim as my invention:

1. In a classifying mechanism for classifying packages according to a predetermined characteristic, the combination of, a sensing device operable to sense said predetermined characteristic and to produce a signal in accordance with this characteristic, an input shaft continuously rotated about a fixed axis, an output shaft journaled to rotate about a second axis, a driving gear fixed to said input shaft to rotate therewith, two driven gears meshing with said driving gear on opposite sides thereof to be driven by the latter in opposite directions, means selectively coupling either of said driven gears to said output shaft in response to said signal to rotate the shaft in either direction, and a classifying member operatively connected to said output shaft to be moved thereby in either of two directions to effect a classifying action.

2. In a classifying mechanism for classifying packages according to a predetermined characteristic, the combination of, a sensing device operable to sense the predetermined characteristic and to produce a signal in accordance with this characteristic, an input shaft continuously rotated about a fixed axis, an output shaft journaled to rotate about a second axis, a driving gear fixed to said input shaft to rotate therewith, two driven gears meshing with said driving gear on opposite sides thereof to be rotated by the latter in opposite directions, two clutches, one coupling each of said driven gears to said output shaft, said clutches being selectively responsive to different signals from said sensing device, and a classifying member operatively connected to said output shaft and mounted to be moved thereby in either of two directions to effect a classifying action.

3. In a classifying mechanism for use in classifying packages according to a predetermined characteristic, the combination of, a sensing device operable to sense a predetermined characteristic and to produce a signal in accordance therewith, an input shaft rotated about a fixed axis, an output shaft journaled to rotate about a second axis, a driving bevel gear fixed to said input shaft to rotate therewith, two driven bevel gears mounted concentric with said output shaft and meshing with said driving gear on opposite sides thereof to be driven by the latter in opposite directions, two electromagnetic clutches each having one member fixed to one of said driven gears and the other member fixed to said output shaft, means selectively engaging said clutches in response to said signal to couple one or the other to said output shaft to rotate the latter in either direction, and a classifying member operatively connected to said output shaft to be moved thereby in either of two directions to effect a classifying action.

4. In a classifying mechanism for use in conjunction with a check weigher for packages, the combination of, an output shaft journaled to rotate about a fixed axis, an input shaft journaled to rotate about a fixed axis perpendicular to said first axis, a bevel gear fixed to said input shaft, a pair of bevel gears meshing with said first bevel gear on opposite sides thereof thereby to be driven by the first gear in opposite directions relative to each other, a clutch having one member driven by one of said pair of bevel gears and the other member coupled to said output shaft, a second clutch having one member driven by one of said pair of bevel gears and the other member coupled to said output shaft, a weighing mechanism operable to produce a signal corresponding to the weight of a package, means responsive to said signal to selectively engage said first and second clutch to rotate said output shaft in either direction, and classifying mechanism operatively connected to said output shaft to move in response to rotation of the shaft and means continuously rotating said input shaft.

5. In a classifying mechanism for use with a check weigher past which articles are moved along a predetermined path, the combination of, a classifying member adapted to move in either direction transversely of the predetermined path, a sensing mechanism operable to sense a predetermined characteristic and to produce a signal in accordance therewith, an input shaft journaled to rotate about a fixed axis, an output shaft journaled to rotate about an axis intersecting said first axis and operatively connected to said classifying mechanism, a bevel gear fixed to said input shaft to rotate therewith, a pair of bevel gears meshing with said first gear on opposite sides thereof to be driven thereby in opposite directions, two clutches each having one member coupled to one of said pairs of gears and the other member coupled to said output shaft, means responsive to said sensing mechanism to selectively engage one or the other of said clutches to rotate said output shaft in either direction and thereby to move said classifying member in one or the other of said directions, and means continuously rotating said input shaft.

References Cited in the file of this patent

UNITED STATES PATENTS

| | | |
|---|---|---|
| 1,927,263 | Hebden | Sept. 19, 1933 |
| 2,010,366 | Kearns | Aug. 6, 1935 |